(12) United States Patent
Bucknell

(10) Patent No.: US 8,864,404 B2
(45) Date of Patent: Oct. 21, 2014

(54) HYDRAULICALLY ASSISTED FASTENERS

(75) Inventor: John Wentworth Bucknell, Indooroopilly (AU)

(73) Assignee: John Wentworth Bucknell (AU)

( * ) Notice: Subject to any disclaimer, the term of this patent is extended or adjusted under 35 U.S.C. 154(b) by 0 days.

(21) Appl. No.: 13/300,017

(22) Filed: Nov. 18, 2011

(65) Prior Publication Data

US 2013/0062876 A1 Mar. 14, 2013

Related U.S. Application Data

(63) Continuation of application No. 10/598,367, filed as application No. PCT/AU2005/000254 on Feb. 25, 2005, now abandoned.

(30) Foreign Application Priority Data

Feb. 25, 2004 (AU) ................................ 2004900923

(51) Int. Cl.
  F16B 37/08 (2006.01)
  F16B 31/04 (2006.01)
  F16B 11/00 (2006.01)

(52) U.S. Cl.
  CPC ............ F16B 31/043 (2013.01); *F16B 11/006* (2013.01)
  USPC ............... 403/31; 403/36; 411/82.1; 411/434

(58) Field of Classification Search
  USPC ............. 403/31, 34, 35, 36, 37, 40; 411/14.5, 411/82.1, 82.3, 462, 434, 917
  See application file for complete search history.

(56) References Cited

U.S. PATENT DOCUMENTS

| 2,571,265 | A | * | 10/1951 | Leufven | 411/434 |
| 3,424,080 | A | * | 1/1969 | Pappas | 411/434 |
| 3,462,180 | A | * | 8/1969 | Bunyan | 403/40 |
| 3,841,193 | A | * | 10/1974 | Ito | 411/916 |
| 5,046,906 | A | * | 9/1991 | Bucknell | 411/432 |
| 5,468,106 | A | * | 11/1995 | Percival-Smith | 411/434 |
| 5,527,015 | A | * | 6/1996 | Percival-Smith | 254/29 A |
| 5,730,569 | A | * | 3/1998 | Bucknell | 411/434 |
| 6,763,570 | B2 | * | 7/2004 | Abbott et al. | 29/525.01 |
| 6,840,726 | B2 | * | 1/2005 | Gosling | 403/31 |
| 7,008,156 | B2 | * | 3/2006 | Imai et al. | 411/14.5 |
| 2005/0089386 | A1 | * | 4/2005 | Kamppila | 411/434 |

* cited by examiner

*Primary Examiner* — Michael P Ferguson
(74) *Attorney, Agent, or Firm* — Dureska, Kennedy & Moore, L.L.C.; David P. Dureska; Edward T. Kennedy

(57) ABSTRACT

Hydraulically assisted fastener (10) comprises a body (11) with a central bore (12) to engage a connector element (20) and with an annular recess (14) opening outwards to an end surface (15). Annular thrust member (17) fits into and seals the recess (14). Charging medium (50) is injected under pressure into annular chamber (30) defined by recess (14) and member (17) and moves body (11) relative to member (17) to tension element (20). Medium (50) sets in chamber (30) to maintain the tension in element (20). Element (20) may be a bolt or stud, body (11) can be a nut and member (17) can be a plan washer. Medium (50) can be a curable viscous paste, a suspended solid in a self-setting compound or a particulate solid which behaves as a fluid. Suitable materials include graphite, and lead, copper or steel balls.

8 Claims, 7 Drawing Sheets

HYDRAULICALLY ASSISTED FASTENERS

CROSS-REFERENCE TO RELATED APPLICATIONS

This application is a continuation of U.S. patent application Ser. No. 10/598,367, filed on Jul. 25, 2008 now abandoned, which claims the benefit of PCT Application Serial No. PCT/AU2005/000254, filed Feb. 25, 2005, and Australian Patent Application Serial No. 2004900923, filed Feb. 25, 2004.

FIELD OF INVENTION

This invention relates to hydraulically assisted fasteners and hydraulic tensioning devices. Such fasteners may comprise a threaded nut or washer and tensioning devices may comprise tensioning rings, particularly those suitable for valves and the like.

BACKGROUND OF THE INVENTION

The use of fasteners employing hydraulically operated components to apply bolt tension is well established. Examples can be found in U.S. Pat. No. 5,730,569 (Bucknell) (=International Application PCT/AU93/00477=International Publication WO 94/07042). Such fasteners are intended to be installed in a manner allowing their periodic removal for servicing or for maintenance of the equipment on which they are fixed. They are seldom used in situations where they may be permanently applied. Factors which discourage the latter are high initial cost compared to other methods of permanent fixing and deterioration of hydraulic seal material over time especially at elevated temperatures.

U.S. Pat. No. 5,730,569 discloses hydraulic fasteners which are simple and therefore inexpensive to produce. However the latter rely on the preservation of seal integrity to maintain the tensile layers in the bolts on which they are applied. Because of the above factors, hydraulically assisted fasteners have not been used in the construction of undersea pipelines nor of conduits for the fixing of flange joins on pipelines, valves and the like. Current methods require divers to operate multiples of specially constructed hydraulic bolt tensioners simultaneously to close underwater flange joints. The cost of such operations is high since they require an entire diving support vessel and crew, as well as divers.

Also the risk to personnel and equipment increases significantly with greater depth as well as the cost. As shallower fields are depleted in offshore oil and gas exploration, drilling and production move to deeper waters, and these factors become significant in determining viability. Remote Operated Vehicles (ROVs) are used to perform complex bolting operations at depth where divers' time is severely restricted. These vehicles are limited in their dexterity and even more unreliable in delivering a satisfactory outcome when encumbered by lack of visibility or limited mobility. Currents and other local environmental conditions can also affect operations and cause a blow out in operating expenses.

It is an object of the present invention to provide hydraulically assisted fasteners and hydraulic tensioning devices which operate without hydraulic seals to directly tension bolts or members on which they are applied or at least provide a useful alternative to the prior art devices.

It is a further object to provide fasteners and devices which do not require locking rings to secure the tensile load produced and which are not subject to the degradation of seal material and which may be used with a charging medium which will not degrade under prevailing operating conditions.

SUMMARY OF THE INVENTION

According to the present invention an hydraulically assisted fastener comprises
a body with a central bore to engage a connector element and with an annular recess opening outwards to an end surface
an annular thrust member which fits into and seals the annular recess
an annular chamber defined by the recess and the thrust member and
a charging medium which is injected into the chamber under pressure and which moves the body relative to the thrust member to tension the connector element and which sets in the chamber to maintain the tension in the connector element.

Preferably the connector element is a bolt or a stud.

Preferably the body is a nut which screws onto the bolt or stud and the thrust member is a washer with a plain bore.

Preferably the recess extends inwards to the bore and the chamber is defined by the recess, the thrust member and the connector element.

Preferably the thrust member is a piston ring incorporating an annular flange which extends around and seals the periphery of the body.

Preferably the body and/or the thrust member incorporate integral deflecting and/or sealing lips which seal the chamber.

Preferably the charging medium is a viscous paste which cures to become solid comprising suspended solids in a self setting compound or particulate solids which behave as fluid media.

Preferably the charging medium is a solid like graphite which is injected into the chamber by using a medium exchanger.

Preferably the charging medium is a particulate solid of a granular nature such as lead, copper or steel balls.

In an alternative form of the invention an hydraulic tensioning device
comprises
a connector body with a plurality of bores which engage connector elements and which have mating recesses opening outwards to an end surface
a plurality of thrust members which seal the recesses
a plurality of chambers defined by the recesses and the thrust members
at least one distribution gallery interconnecting the chambers and
a charging medium which is injected under pressure into the chambers via the distribution gallery or galleries and which moves the connector body relative to the thrust members to tension the connector elements and which sets in the chambers to maintain tension in the connector elements.

Preferably the bores are inwardly convergent and receive nut cones which lock the connector body to the connector elements.

Preferably the recesses extend inwards to the bores and the chambers are defined by the recesses, the thrust members and the connector elements.

Preferably there are additional recesses between adjacent bores.

Preferably the connector body and the thrust members are annular discs adapted for use in the flange joints of pipelines, valves and similar apparatus.

Preferably the connector body and the thrust member are square, rectangular, hexagonal, polygonal, circular, elliptical or any other shape.

BRIEF DESCRIPTION OF THE DRAWINGS

To enable the invention to be fully understood, preferred embodiments will now be described with reference to the accompanying drawings, in which.

DETAILED DESCRIPTION OF THE INVENTION

Figure 1:
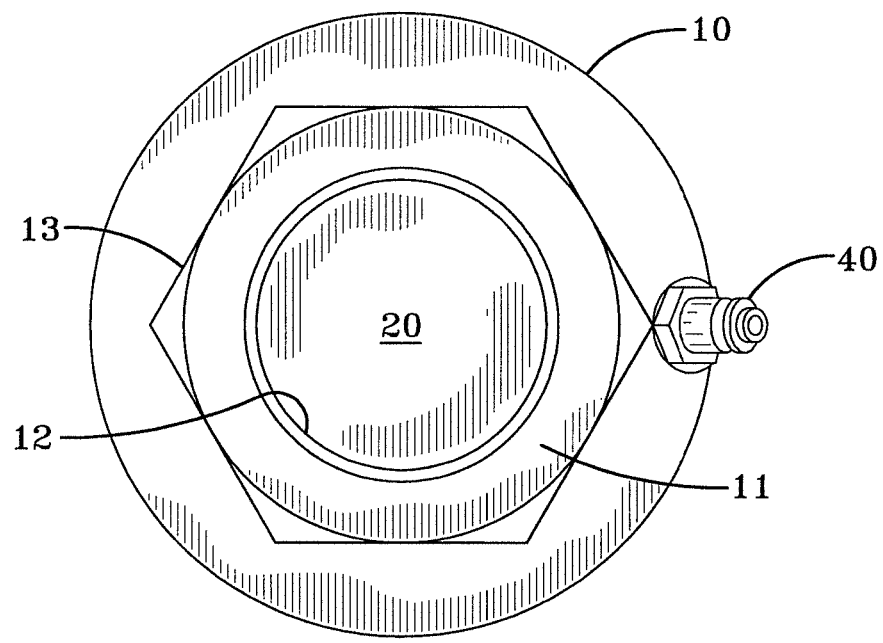
FIG. 1 is a plan view of an hydraulically assisted fastener.
Figure 2:
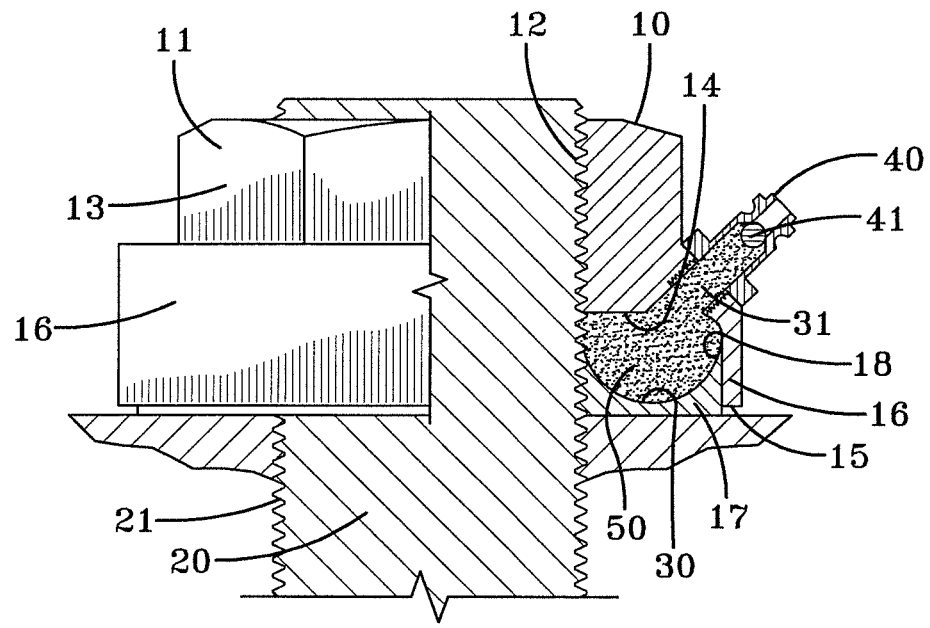
FIG. 2 is a partial cutaway elevation of the fastener of FIG. 1.
Figure 3:
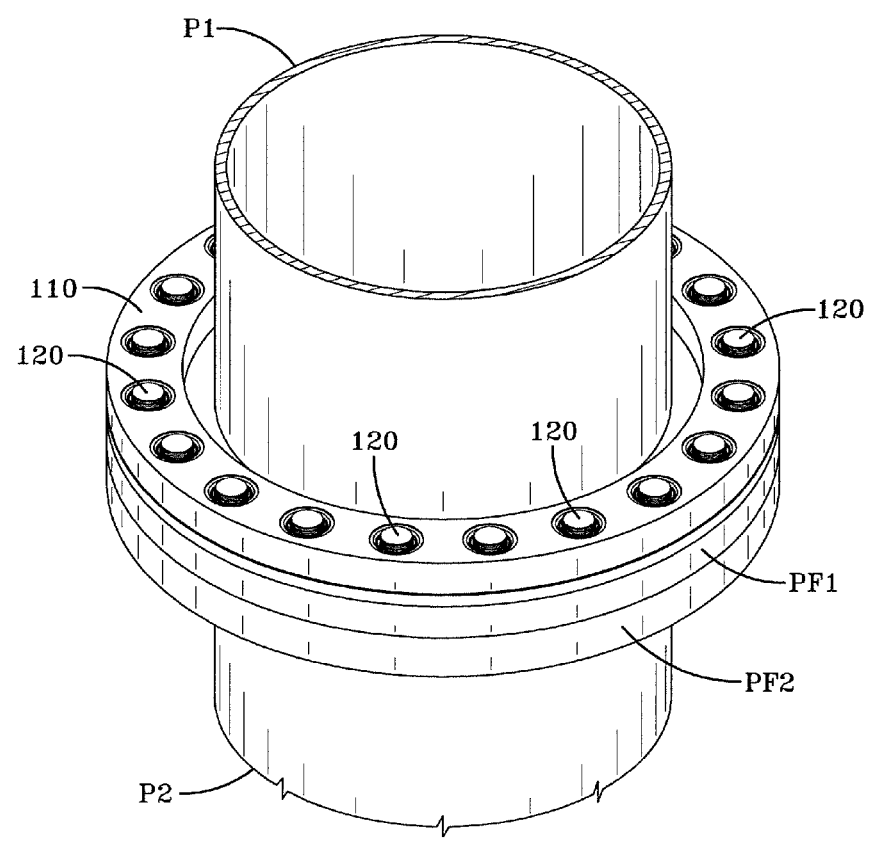
FIG. 3 is an isometric view of an hydraulic tensioning assembly fastening a flange joint.

FIGS. 1 and 2 show an hydraulic fastener 10 which engages a screw threaded bolt 20. Fastener 10 has a body 11 with a screw threaded bore 12 which engages threads 21 on bolt 20. Body 11 has six flat faces 13 to provide purchase for a tensioning tool. The external profile of body 11 can be varied to suit the different types of tensioning tools available.

Annular recess 14 is formed in body 11 and opens outwards to end face 15 and inwards to bore 12 of body 11. The lower portion of body 11 has a peripheral skirt 16 which surrounds annular recess 14. A thrust member 17 in the form of an annular washer fits into annular recess 14 and has a curved upper face 18.

An annular chamber 30 is defined by annular recess 14 in body 11, thrust washer 17 and the outer thread of bolt 20. Nipple 40 has a one-way valve 41 and screws into peripheral skirt 16 of body 11 and is connected to annular chamber 30 by passage 31.

Nipple 40 can be connected to a source of charging medium 50 such as a particulate solid which is injected under pressure through nipple 40 into annular chamber 30 to expand the working volume of annular chamber 30. Connector body 11 moves in a direction opposite to thrust washer 17 to apply tension to bolt 20. When the required tension has been applied to bolt 20, the source of charging medium 50 is disconnected from nipple 40 and backflow is prevented by one-way valve 41.

Charging medium 50 may also be a viscous paste which cures to become solid, a suspended solid in a self-setting compound, or a particulate solid which behaves as a fluid. If the source of the charging medium incorporates a media exchanger, solid injectable media such as graphite may also be used. Particulate solids of a granular nature such as lead, copper or steel balls may also be used as charging materials. Charging medium 50 sets and forms a solid block which prevents movement of body 11 relative to thrust washer 17, an so prevents any reduction of the tension applied by hydraulic fastener 10 to bolt 20. By using any of the above charging media, the need for seals between thrust washer 17 and the adjacent contact wall of annular recess 14 in body 11 is removed. Accordingly any reduction of the tension applied to bolt 20 due to seal deterioration is avoided.

FIGS. 2 to 6 show a second hydraulic tensioning device 110 used to join pipe flanges PF1 and PF2 of respective pipes P1 and P2 at a flange joint. For ease of manufacture, hydraulic tensioning device 110 has a device body in the shape of a ring formed of upper and lower annular discs 111, 112. Upper disc 111 has a plurality of downwardly convergent bores 113 through it to receive bolts 120 which extend above pipe flange PF1. Each conical bore 113 is shaped to receive a trifurcated nut cone 122 which engages screw threads 121 on bolt 120. Cone 122 is prevented from escaping from conical bore 113 by spring clip 123. Lower disc 112 has bores of larger diameter than bore 113 through it which form, with upper disc 111, annular recess 114 which house thrust washers 117 so that upper 111 and lower 112 discs, thrust washer 117 and bolt 120 form an annular chamber 130 to receive charging medium 150.

Each annular chamber 130 surrounding bolt 120 is interconnected by distribution galleries 151 extending around upper 111 and lower 112 discs. By manufacturing the connector body as two discs, distribution galleries 151 can be machined and upper 111 and lower 112 discs can be locked together by a plurality of joining bolts 119.

Figure 6:
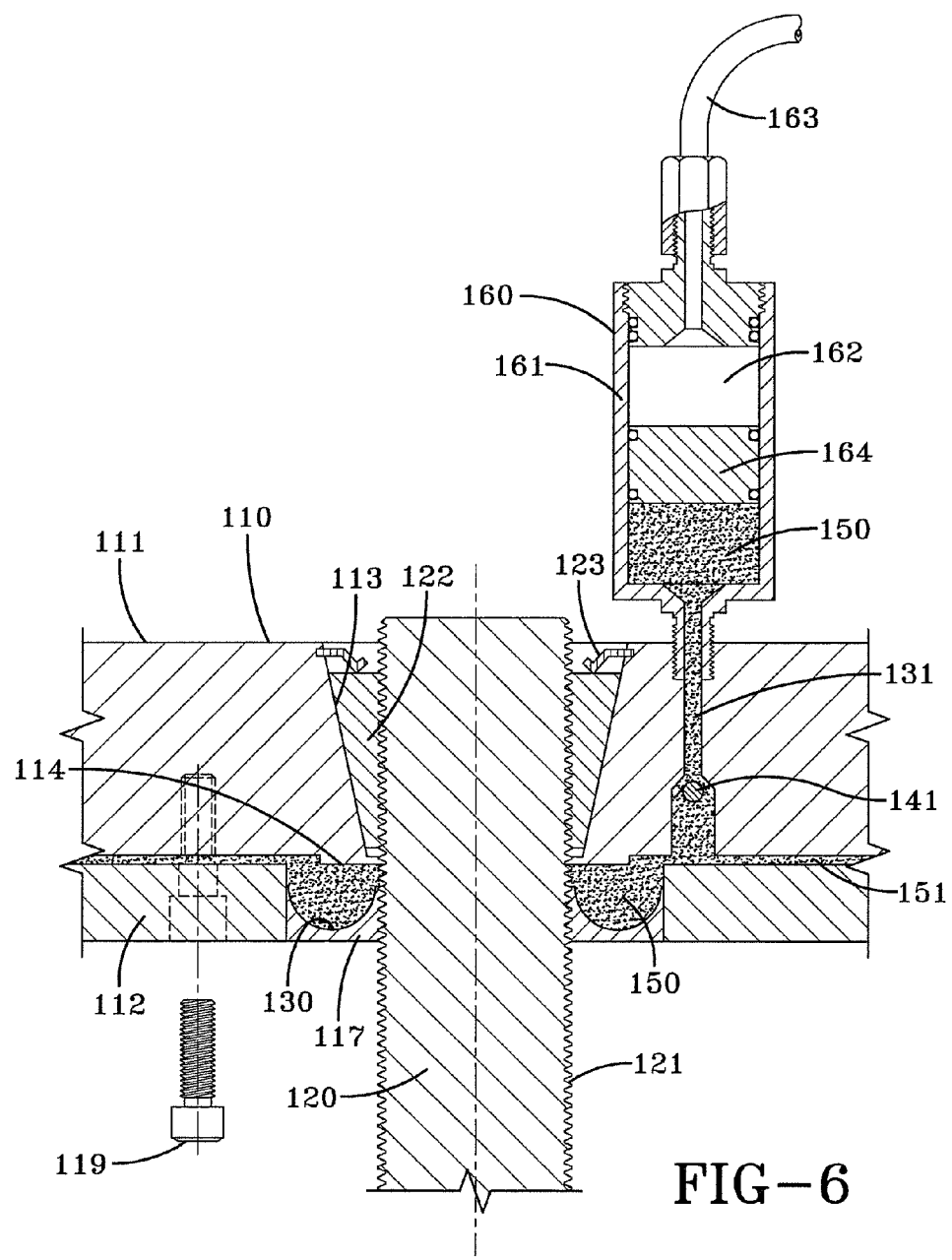
FIG. 6 is a cross sectional elevation showing an hydraulic charging device.

As illustrated in FIG. 6, charging medium 150 is injected under high pressure using media exchanger 160 which is screwed into passage 131 connecting to distribution gallery 151. Passage 131 contains non return valve 141 which operates the same way as non return valve 41 in nipple 40 in FIGS. 1 and 2. Media exchanger 160 has a body 161 which is connected to a source of hydraulic oil 162 via a hydraulic line 163. Hydraulic oil 162 is forced into media exchanger 160 under pressure to cause separator piston 164 to move in body 161 of media exchanger 160 thus causing expelling medium 150 from media exchanger 160. This increases the effective volume of annular chambers 130 and discs 111 and 112 move relative to thrust washers 117 to tension bolts 120 to the required amount.

When the required tension has been achieved in bolts 120, media exchanger 160 is disconnected from passage 131 and non-return valve 141 prevents the release of charging medium 150 from device 110. As described above charging medium 150 sets to prevent movement of discs 111 and 112 relative to thrust washers 117 thereby preventing any reduction in tension applied to bolts 120.

It will be apparent to the skilled addressee that manufacture of hydraulic tensioning device 110 is relatively simple and inexpensive since no complex machining operations nor tooling is required. The upper and lower discs 111 and 112 of the connector body are bolted together by bolts 119 to enclose distributor gallery 151 and so no intricate drilling operations are required. Each trifurcated nut 122 is inserted in its conical bore 113 and retained with spring clip 123 which provides both retaining and closing forces for the nut 122 assembly.

Figure 4:
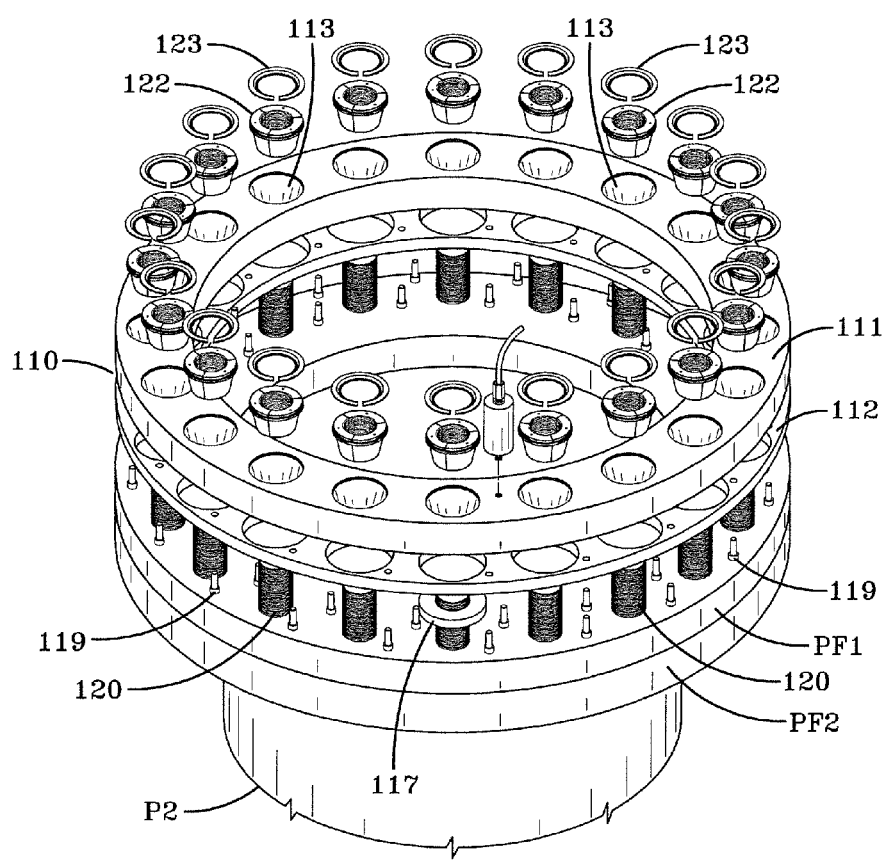
FIG. 4 is an exploded view of the assembly of FIG. 3.
Figure 5:
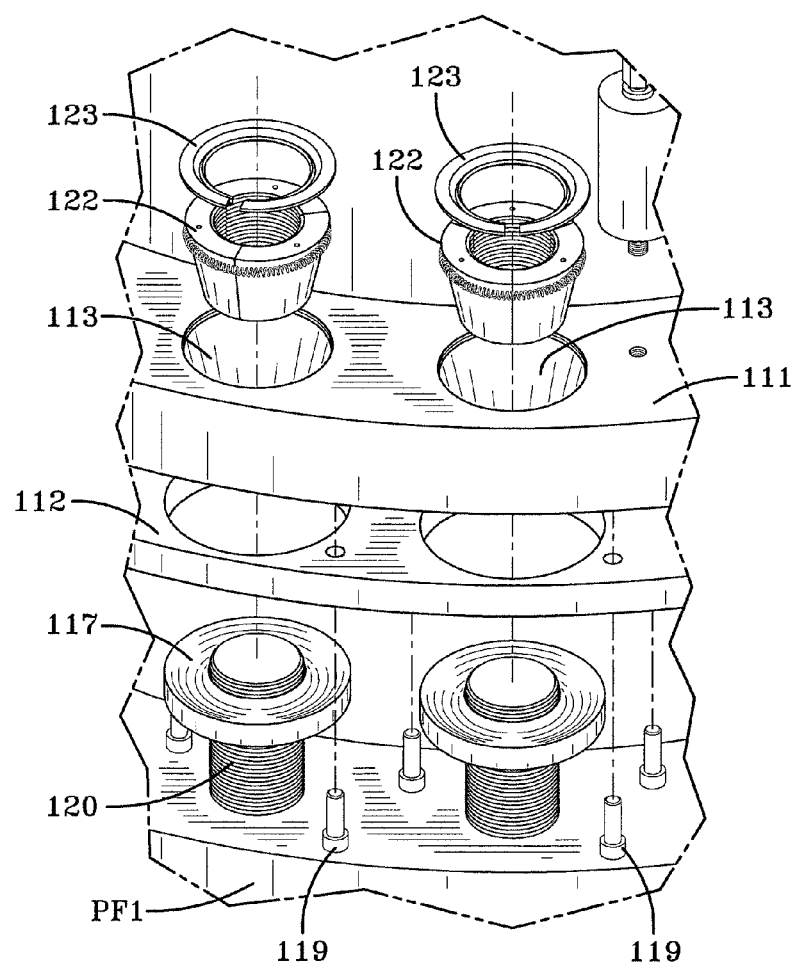
FIG. 5 is an enlarged partial view of FIG. 4.

To install, hydraulic tensioning device 110 is fitted over bolts 120 protruding from pipe flange PF1 as shown in FIG. 4. The action of pushing hydraulic tensioning device 110 over bolts 120 allows cone nuts 122 to ratchet over the bolt threads, and eliminates the need to screw the nuts into place.

As described above, charging medium 150 flows to each annular chamber 130 via distributor gallery 151 forcing thrust washers 117 to react against adjacent pipe flange PF1. This creates tensile forces which are evenly and simultaneously distributed to each bolt 120. One way valve 141 automatically activates and the pressure pumping apparatus is removed with full pressure remaining in the assembly. Where setting paste is used as the charging medium it will cure rapidly preventing any leakage and subsequent loss of tensile load on bolts 120. When a particulate solid is used as the charging medium it will retain the tensile load indefinitely as it is already at a high density.

Figure 7:
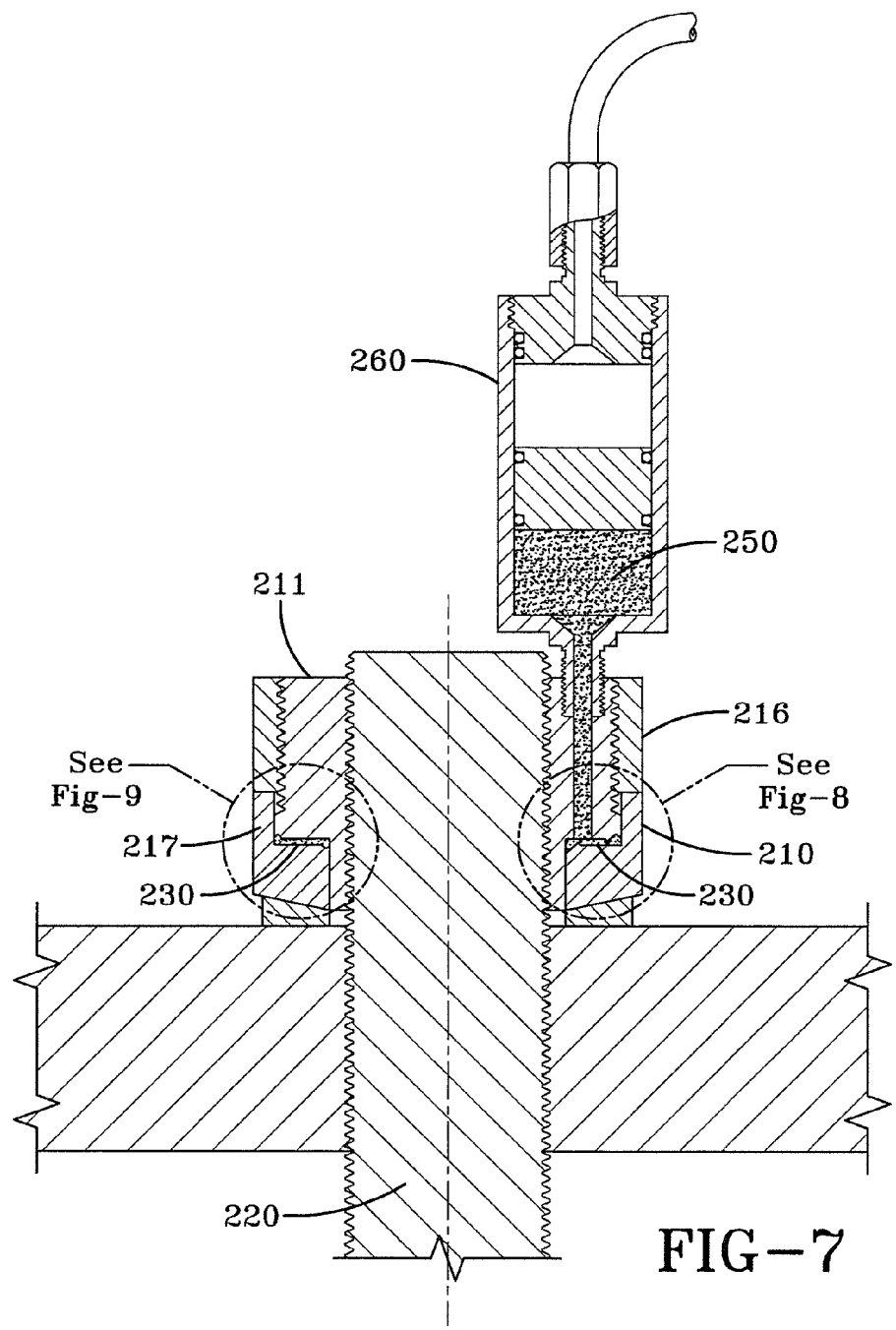
FIG. 7 is a cross sectional elevation showing an alternative to FIG. 6.

FIG. 7 illustrates a third embodiment of the present invention where a standard form of hydraulic nut 210 is charged with charging medium 250 using media exchanger 260 in the same manner described with reference to FIGS. 3 to 7. In this case, the pressure of the charging medium is not required to be maintained since the force generated is maintained by locking ring 216 which is screwed into nut 211 and engaged with piston 217 which cooperates with nut 211 to form annular chamber 230. When this type of hydraulic nut needs to be removed intact at a later time, the charging medium used will be of a fluid nature in order to assist with re-pressurisation for loosening lock ring 216.

Figure 8:
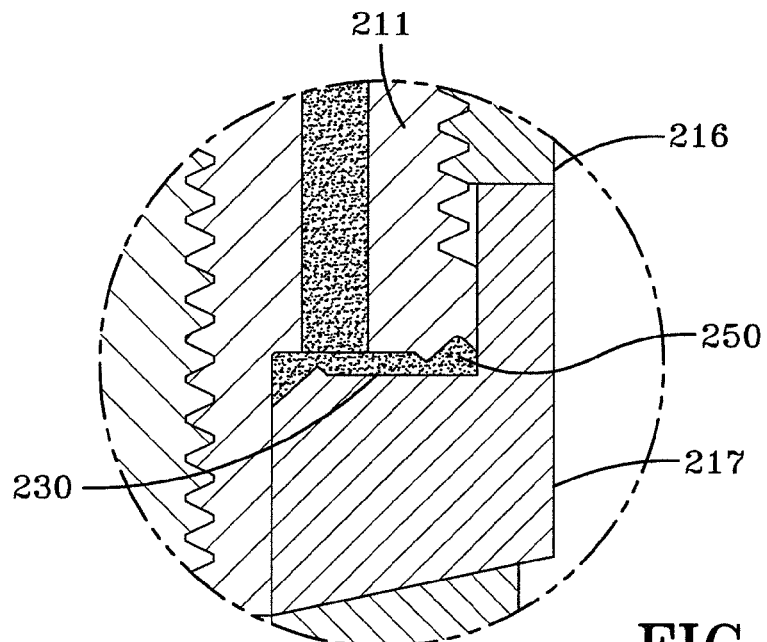
FIGS. 8 and 9 are enlarged partial views of FIG. 7.
Figure 9:
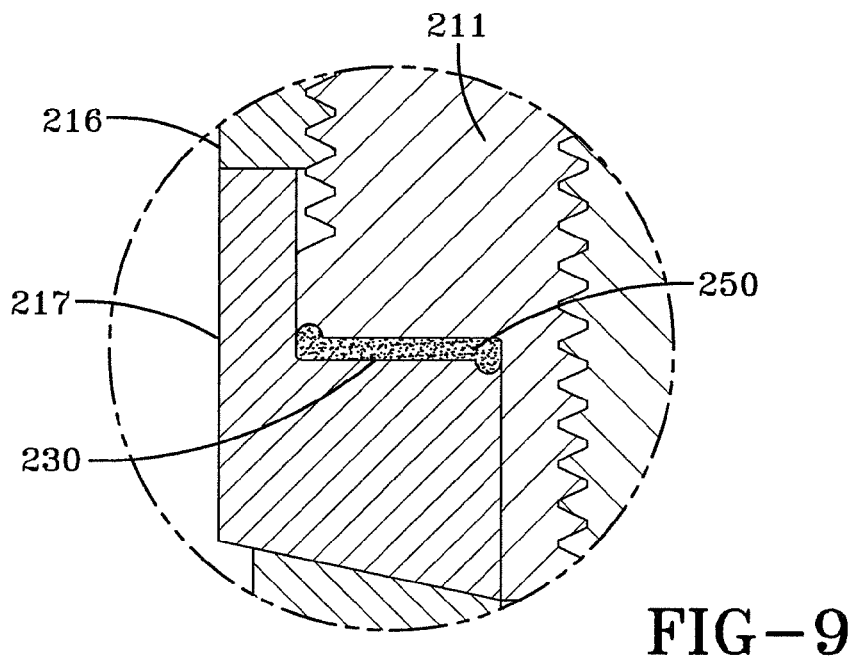

Owing to the nature of the charge medium used, the sealing capacity of fasteners 10, 210 of tensioning devices 110 need only be rudimentary. As illustrated in FIGS. 8 and 9 the leading edges of components and sliding engagement may be altered in order to enhance the sealing ability when viscous materials are used as the charging media.

The use of charging media 50, 150, 250, and in particular, the use of solid injectable media such as graphite and of particulate solids of a granular nature such as steel balls will allow the hydraulic tensioning fasteners and hydraulic tensioning devices of the present invention to be used in high temperature applications. In these situations it may be desirable to use the hydraulic nut of FIGS. 7 to 9 which has a locking ring 216 to retain the required toad. Removal of fastener 210 would require injection of charging medium 250 to loosen locking ring 216 and to release the pressure to allow device 210 to be unscrewed from bolt 220.

VARIATIONS

It will be realized that the foregoing has been given by way of illustrative example only and that all other modifications and variations as would be apparent to persons skilled in the art are deemed to fall within the broad scope and ambit of the invention as herein set forth. Throughout the description and claims to this specification the word "comprise" and variation of that word such as "comprises" and "comprising" are not intended to exclude other additives components integers or steps.

What is claimed is:

1. An hydraulically assisted fastener comprising:
a nut including a central bore formed with internal threads capable of engaging a connector element, the nut comprising a cylindrical upper nut portion having external threads, a cylindrical lower nut portion, and an annular exterior step comprising a downwardly-facing surface extending between peripheral surfaces of the upper and lower nut portions, a first annular nut sealing lip extending along a peripheral edge of the exterior step and a second annular nut sealing lip protruding from the downwardly-facing surface of the exterior step to define an annular recess therebetween, and an axial passage extending through the upper nut portion through the exterior step and opening outwards to an upper end surface of the nut;
a piston ring comprising an annular lower ring portion having a central bore which extends around and seals the periphery of the lower nut portion and comprising an upwardly-facing surface facing the exterior step, and an annular flange extending upwardly from a peripheral edge of the lower ring portion which extends around and seals the periphery of the upper nut portion, a first annular piston ring sealing lip extending along a peripheral edge of the piston ring central bore and a second annular piston ring sealing lip protruding from the upwardly-facing surface of the lower ring portion to define an annular recess therebetween;
the exterior step and the lower ring portion forming an annular chamber in fluid communication with the nut annular recess, the piston ring annular recess and the axial passage, the chamber being sealed between the nut and the piston ring by the first nut sealing lip and the first piston ring sealing lip; and
an external locking ring engaging the piston ring and having a central bore being formed with internal threads that engage the nut external threads, whereby the nut and the piston ring engage the connector element to pre-tighten the fastener, a viscous or solid injectable charging medium is injected into the annular chamber through the axial passage under pressure and moves the piston ring downwardly relative to the nut to tension the connector element, and the locking ring maintains the tension in the connector element.

2. The fastener of claim 1, further comprising a connector element engaged by the internal threads of the nut, in which the connector element is at least one of a bolt or a stud.

3. The fastener of claim 1 in which the charging medium is a viscous paste which cures to become solid compromising suspended solids in a self setting compound or particulate solids which behave as fluid media.

4. The fastener of claim 1 in which the charging medium is a solid injectable media which is injected into the annular chamber by using a medium exchanger.

5. The fastener of claim 4, wherein the solid injectable media is graphite.

6. The fastener of claim 1 in which the charging medium is a particulate solid of a granular nature.

7. The fastener of claim 6, wherein the particulate solid includes at least one of lead, copper, or steel balls.

8. The fastener of claim 1, in which the nut is formed with threads about a portion of the axial passage, and a nipple of a medium exchanger is threaded into the axial passage, in the nut.

\* \* \* \* \*

UNITED STATES PATENT AND TRADEMARK OFFICE
CERTIFICATE OF CORRECTION

PATENT NO. : 8,864,404 B2  
APPLICATION NO. : 13/300017  
DATED : October 21, 2014  
INVENTOR(S) : John Wentworth Bucknell Page 1 of 1

It is certified that error appears in the above-identified patent and that said Letters Patent is hereby corrected as shown below:

In the Claims

In Claim 8, at Column 6, line 51, the "," in the phrase "axial passage, in the" should be deleted.

Signed and Sealed this
Twenty-seventh Day of January, 2015

Michelle K. Lee
*Deputy Director of the United States Patent and Trademark Office*